C. E. FOLK.
DEVICE FOR SQUARING PISTONS AND SCRAPING BEARINGS.
APPLICATION FILED MAY 27, 1921.

1,438,478.

Patented Dec. 12, 1922.

Inventor:
Charles E. Folk
By Chapin A. Ferguson
Attorney.

Patented Dec. 12, 1922.

1,438,478

UNITED STATES PATENT OFFICE.

CHARLES E. FOLK, OF HAGERSTOWN, MARYLAND.

DEVICE FOR SQUARING PISTONS AND SCRAPING BEARINGS.

Application filed May 27, 1921. Serial No. 473,031.

*To all whom it may concern:*

Be it known that I, CHARLES E. FOLK, a citizen of the United States, residing at Hagerstown, in the county of Washington and State of Maryland, have invented certain new and useful Improvements in Devices for Squaring Pistons and Scraping Bearings, of which the following is a specification.

This invention relates to improvements in devices for squaring pistons and scraping bearings, and has for its object to provide a simple, cheap and efficient device for setting pistons true on the crank-shaft, and for scraping the crank-shaft bearings.

The invention consists of the novel construction and arrangement of the parts and combination of parts hereinafter more fully set forth in the following specification and pointed out in detail in the appended claims.

In the accompanying drawing.

Figure 1:
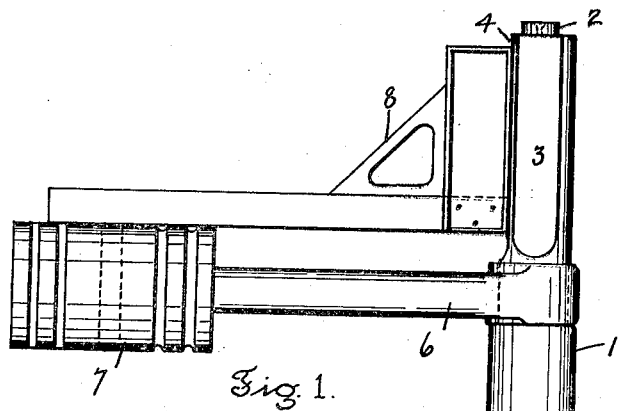
Figure 1 is a side view of my invention projecting through the end of a connecting rod and showing the piston being squared thereon.
Figure 2:
Figure 2 is an enlarged side view of my invention.
Figure 3:
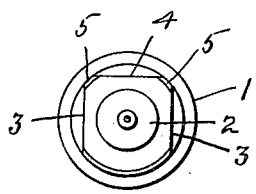
Figure 3 is an end view of Fig. 2.

Referring to the accompanying drawing forming part of this specification, and in which like reference numerals designate like parts throughout the several views thereof, 1 designates a metal mandrel, the central portion of which is cylindrical one half of the said mandrel 1 being larger in circumference than the other half in order to accommodate different sizes of bearings. The outer ends of said mandrel 1 are provided with central lugs 2 adapted to be held in a chuck. Back of said lugs 2 the ends are provided with flat surfaces 3 on opposite sides thereof so that the device can be held between the jaws of a vise, the upper surfaces 4 of said ends being flat for the purpose of holding a square or other suitable instrument when the piston is being squared on the connecting rod. The edges 5, adjacent flat surfaces 3 and 4, are sharp and afford a cutting edge for the purpose of scraping the bearing.

The rounded end of the device is placed in the end of the piston rod 6 of the piston 7, as shown in Fig. 1, and the square 8 is placed on the flat surface 4 with its upper edge projecting against the outer surface of the piston 7 and when the latter is perfectly square on the rod 6 the mandrel is removed from the rod and the piston is then connected up to the crank-shaft of the engine. When the bearings are to be scraped the mandrel is inserted into the piston rod until the latter rests over the edges 5 when the said mandrel can be revolved in the rod 6 thus thoroughly scraping the said bearing.

Having thus described my invention what I claim is:—

1. A device for squaring pistons and scraping bearings, having a cylindrical middle portion, flat opposite side surfaces at each end thereof, and a flat intervening surface, and cutting edges on each side of the flat intervening surface.

2. A device for squaring pistons and scraping bearings, comprising a mandrel, one half of which is larger in circumference than the other half and having a cylindrical middle portion, flat opposite side surfaces at each end of said mandrel, a flat intervening surface, and a lug on each end of said mandrel.

3. A device for squaring pistons and scraping bearings, comprising a mandrel having a cylindrical middle portion, flat opposite side surfaces at the ends, and a flat intervening surface, cutting edges at each side of said flat intervening surface, and a lug projecting from each end of said mandrel.

In testimony whereof I affix my signature.

CHARLES E. FOLK.